RE 24792
July 7, 1959  W. P. DALRYMPLE  2,893,362
INTERNAL COMBUSTION ENGINE HAVING CRANKSHAFT DRIVEN
ROTARY MEANS FOR REMOVING ENTRAINED LIQUID FROM
FLUID SUPPLIED TO THE FIRING CHAMBER
Filed Aug. 7, 1953  8 Sheets-Sheet 1
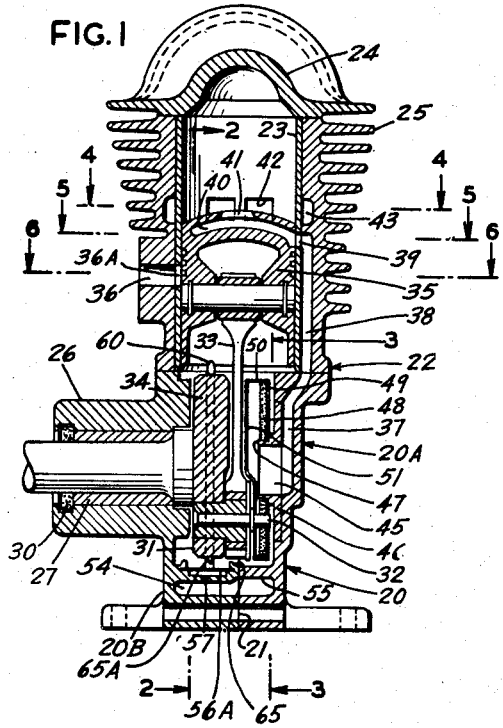
FIG. 1
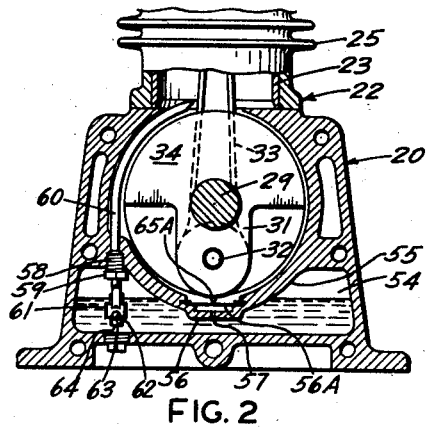
FIG. 2
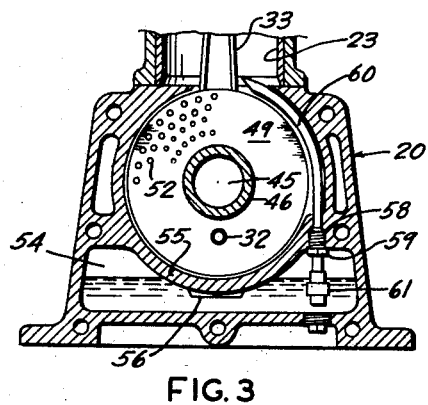
FIG. 3
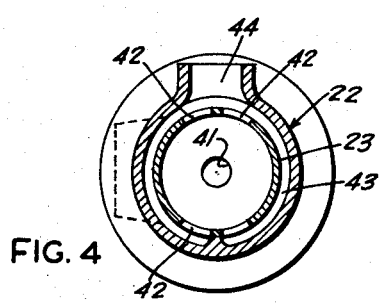
FIG. 4
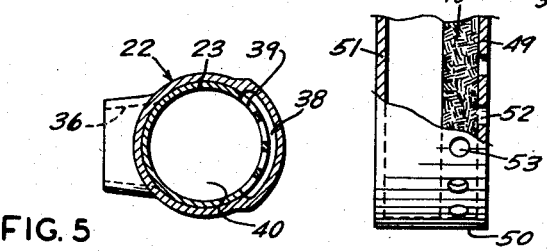
FIG. 6
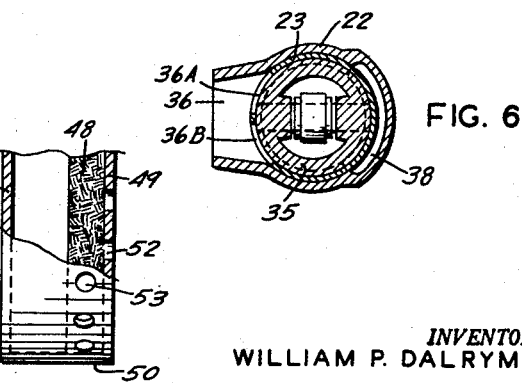
FIG. 5
FIG. 7
*INVENTOR.*
WILLIAM P. DALRYMPLE
BY *Wallace and Cannon*
ATTORNEYS

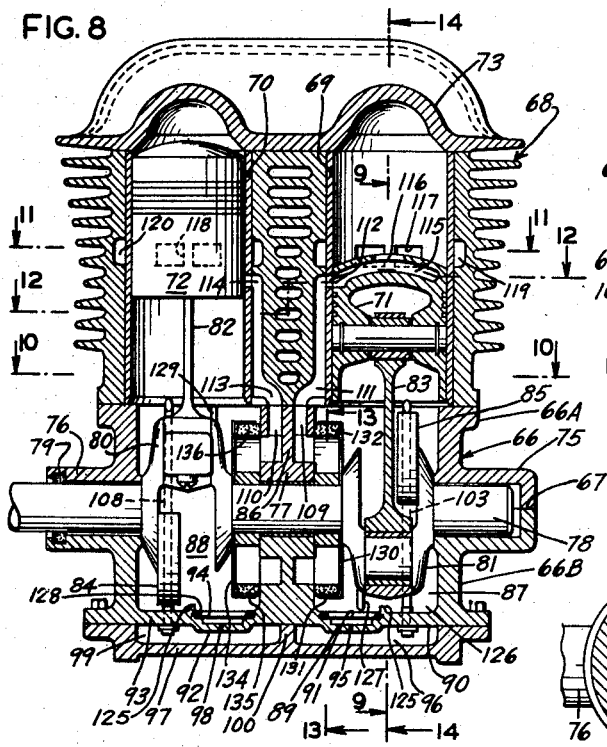

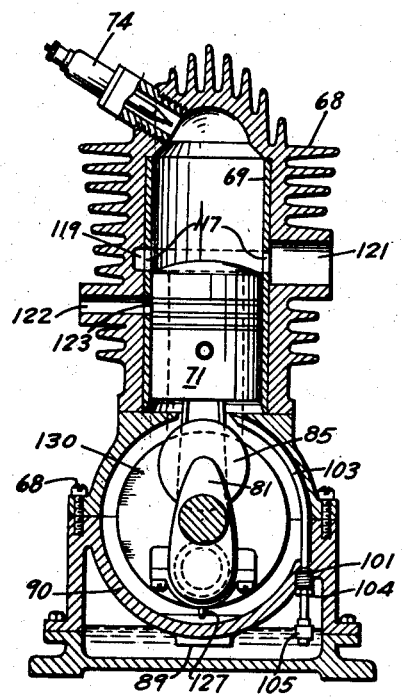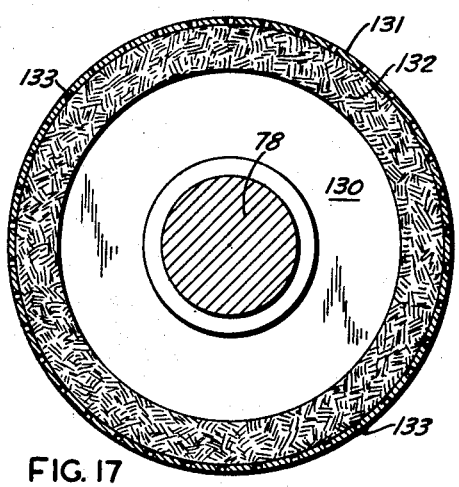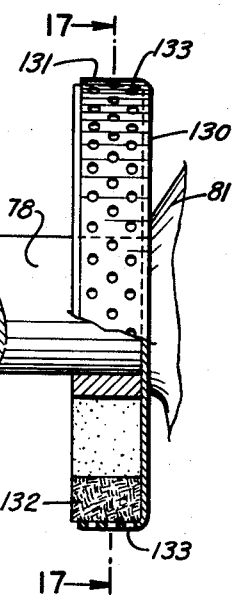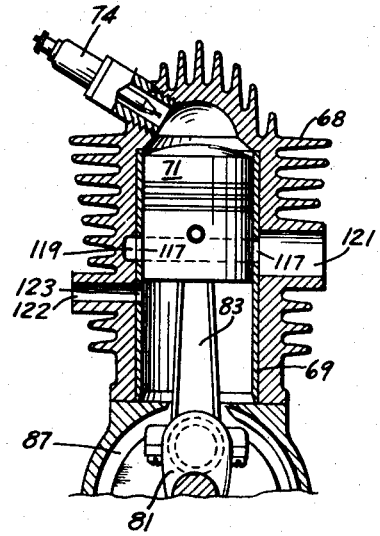

July 7, 1959
W. P. DALRYMPLE
2,893,362
INTERNAL COMBUSTION ENGINE HAVING CRANKSHAFT DRIVEN
ROTARY MEANS FOR REMOVING ENTRAINED LIQUID FROM
FLUID SUPPLIED TO THE FIRING CHAMBER
Filed Aug. 7, 1953
8 Sheets-Sheet 4
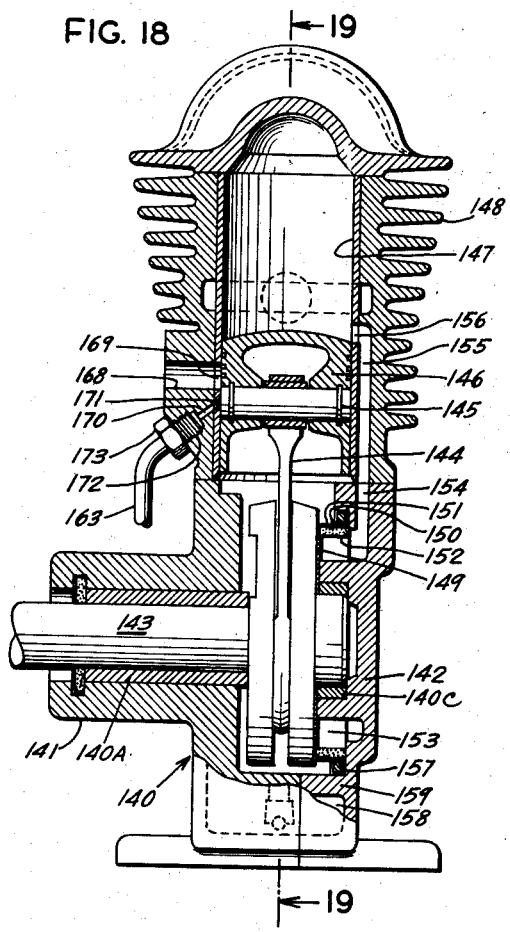
FIG. 18
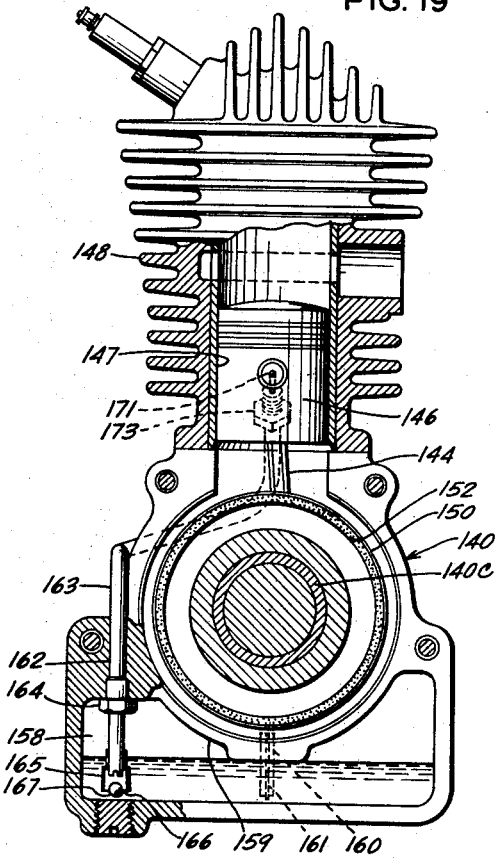
FIG. 19
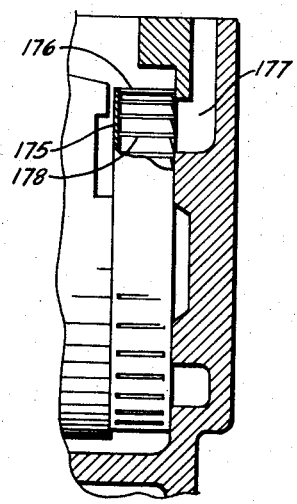
FIG. 20
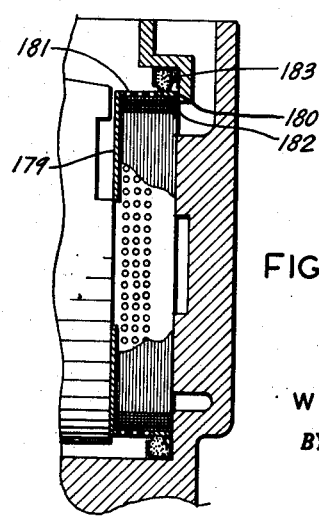
FIG. 21
FIG. 21A
INVENTOR.
WILLIAM P. DALRYMPLE
BY Wallace and Cannon
ATTORNEYS

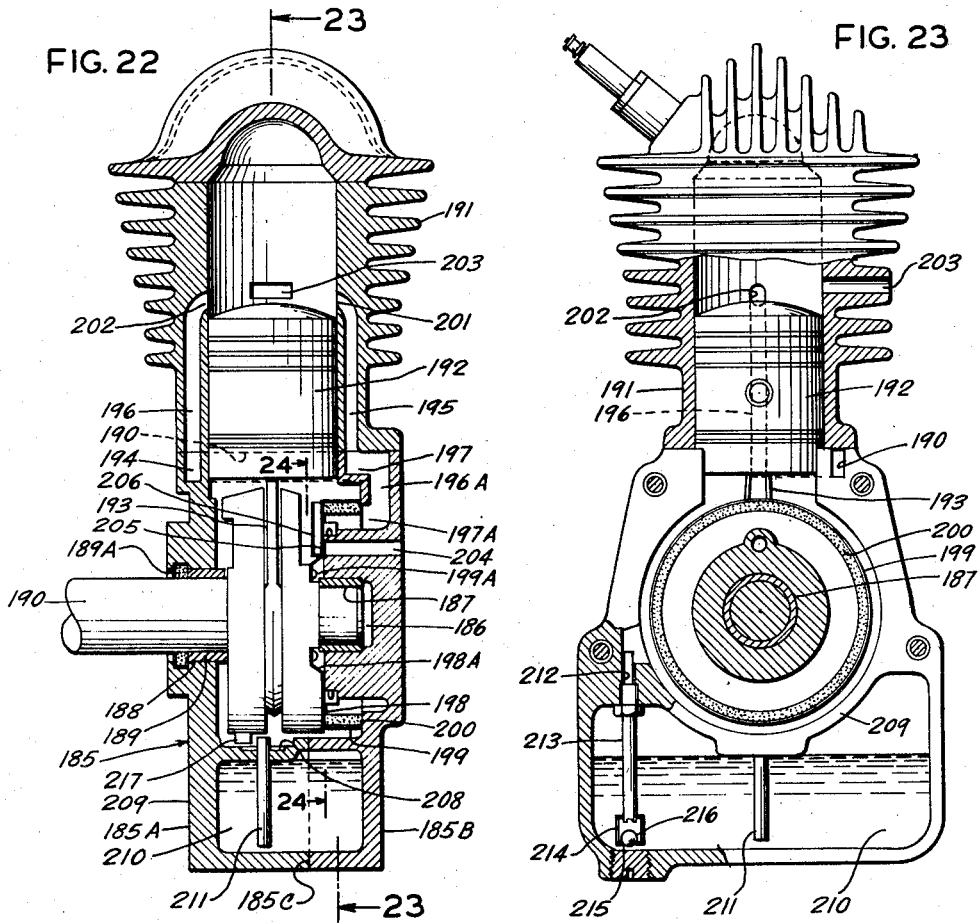

July 7, 1959 W. P. DALRYMPLE 2,893,362
INTERNAL COMBUSTION ENGINE HAVING CRANKSHAFT DRIVEN
ROTARY MEANS FOR REMOVING ENTRAINED LIQUID FROM
FLUID SUPPLIED TO THE FIRING CHAMBER
Filed Aug. 7, 1953 8 Sheets-Sheet 6

INVENTOR.
WILLIAM P. DALRYMPLE
BY Wallace and Cannon

ATTORNEYS

July 7, 1959  W. P. DALRYMPLE  2,893,362
INTERNAL COMBUSTION ENGINE HAVING CRANKSHAFT DRIVEN
ROTARY MEANS FOR REMOVING ENTRAINED LIQUID FROM
FLUID SUPPLIED TO THE FIRING CHAMBER
Filed Aug. 7, 1953  8 Sheets-Sheet 7

INVENTOR.
WILLIAM P. DALRYMPLE

BY *Wallace and Cannon*

ATTORNEYS

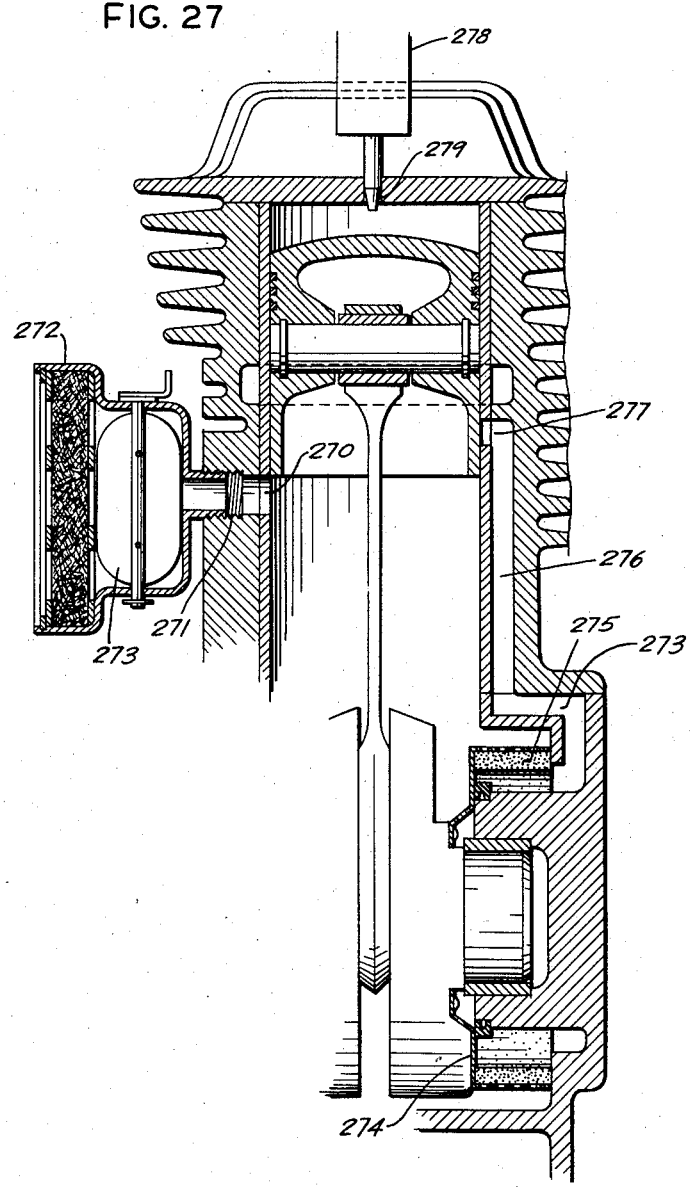

United States Patent Office 2,893,362
Patented July 7, 1959

2,893,362

INTERNAL COMBUSTION ENGINE HAVING CRANKSHAFT DRIVEN ROTARY MEANS FOR REMOVING ENTRAINED LIQUID FROM FLUID SUPPLIED TO THE FIRING CHAMBER

William P. Dalrymple, Rochester, N.Y., assignor to American Brake Shoe Company, Wilmington, Del., a corporation of Delaware Application August 7, 1953, Serial No. 372,825

28 Claims. (Cl. 123—73)

This application is a continuation-in-part of my co-pending application, Serial No. 307,118, filed August 29, 1952, now abandoned.

This invention relates to two-cycle internal combustion engines.

Appreciable difficulty has been encountered in the lubrication of two-cycle internal combustion engines. especially because the most common expedient has been to mix the lubricant with the fuel for the engine. As a result of this, lubricant passes to the firing chambers of the engine where, because it may not be properly burned, carbon deposits are resultingly formed and particularly where such deposits foul the spark plugs, the efficiency of the engine is impaired. Moreover, in operation of engines of this kind, the carbon deposits so build up that it is necessary, at rather frequent intervals, to tear down the engine and remove the carbon deposits. It is therefore, the primary object of my invention to lubricate two-cycle internal combustion engines without resorting to the expedient of mixing the lubricant with the fuel to be supplied to the engines.

Another important object of this invention is to effect lubrication of two-cycle internal combustion engines by causing lubricant to be supplied to the operative parts thereof as an incident to pressure variations induced in the crank cases of such engines in the course of reciprocations of the pistons thereof; and ancillary objects are to afford reservoirs in association with the crank cases of internal combustion engines and to so establish communication between such crank cases and reservoirs that pressure variations in the crank cases of the engines, induced as an incident to the reciprocations of the pistons of the engines, will cause lubricant to be supplied to the operative parts of the engines; to direct lubricant from reservoirs of the aforesaid character to operative parts of the engines in such a way that a supply of lubricant will be built up so as to insure that at least some lubricant will be supplied to the operative parts of the internal combustion engines as an incident to reciprocations of the pistons of such engines; to insure a supply of sufficient lubricant to the bearings in engines of the aforesaid character so that resort may be had to conventional sleeve bearings and thereby avoid the use of relatively expensive so-called anti-friction bearings of the ball or roller type; and to enable the foregoing objects to be realized in a novel, economical and expeditious manner.

Other objects are to lubricate a two-cycle internal combustion engine by resort to an arrangement of such nature that lubricant may be discharged on to moving parts of the engine so as to thereby facilitate dispersion of the lubricant to operative parts of the engine; to enable lubricant to be collected in the crank case in such position that a quantity of the lubricant will collect therein in position to be picked up by operative parts of the engine to be distributed to such parts; and to enable lubricant to be supplied to a cylinder wall in an engine of the aforesaid character adjacent to a fuel intake port so as to thereby assure a supply of lubricant on the cylinder wall adjacent to such a port.

It is customary in two-cycle engines to so seal or otherwise arrange the crank cases thereof that the down strokes of the pistons of the engine may be utilized to compress fluid admitted to the crank case, such fluid either being air that is to be subsequently directed to the firing chambers of the engines or an admixture of air and fuel that is to be directed to such firing chambers. It has been observed, where fluid is so compressed in the crank cases of two-cycle engines in instances where lubricant is present in the crank cases in the form of a mist, as will be true where resort is had to lubrication of two-cycle internal combustion engines in accordance with this invention, that the lubricant will become entrained in the compressed fluid and will be carried to the firing chambers and this results in the formation of objectionable carbon deposits as referred to above and consequently it is a yet further important object of this invention to remove entrained lubricant and the like from fluid compressed in the crank cases of internal combustion engines as aforesaid prior to the passage of the compressed fluid to the firing chambers of the engines; and objects ancillary to the foregoing are to interpose filter means between the crank cases and firing chambers of two-cycle engines which will be effective to remove entrained lubricant and the like from fluid compressed as aforesaid in the crank cases of such engines; to impart movement such interposed filter means so that the same will remain effective over protracted periods; and to so arrange filter means of the aforesaid character that rotary movement may be imparted thereto whereby incidental centrifugal force may be effective to expel lubricant picked up thereby.

A further object of this invention is to afford a rotary filter of the aforesaid character in the crank case of a two-cycle internal combustion engine and to utilize such filter to control the admission of a fluid to the crank case to be compressed therein, and also to so arrange the filter that compression of the fluid in the crank case will be augmented.

A still further object is to afford novel arrangements whereby fuel may be introduced into air compressed in the crank case of a two-cycle engine after the air has passed through filter means of the aforesaid character and prior to admission of the air to a firing chamber of the engine.

Other and further objects of the present invention will be apparent from the following description and claims and are illustrated in the accompanying drawings, which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a vertical sectional view of a single cylinder two-cycle internal combustion engine embodying my invention;

Figs. 2, 3, 4, 5 and 6 are sectional detail views taken substantially and respectively on the lines 2—2, 3—3, 4—4, 5—5 and 6—6 on Fig. 1;

Fig. 7 is a fragmentary detail view, partly in elevation and partly in section, showing a novel filter arrangement utilized in the engine shown in Figs. 1 to 6, inclusive;

Fig. 8 is a view similar to Fig. 1 showing a two cylinder two cycle internal combustion engine embodying my invention;

Figs. 9, 10, 11, 12, 13 and 14 are sectional views taken substantially and respectively along the lines 9—9, 10—10, 11—11, 12—12, 13—13 and 14—14 on Fig. 8;

Fig. 15 is a fragmentary view similar to Fig. 14 showing the parts in a different operative position;

Fig. 16 is a view, partly in elevation and partly in section, of the novel filter arrangement utilized in the engine shown in Figs. 8 to 15, inclusive; and Fig. 17 is a sectional detail view taken substantially on the line 17—17 on Fig. 16.

Figure 25:
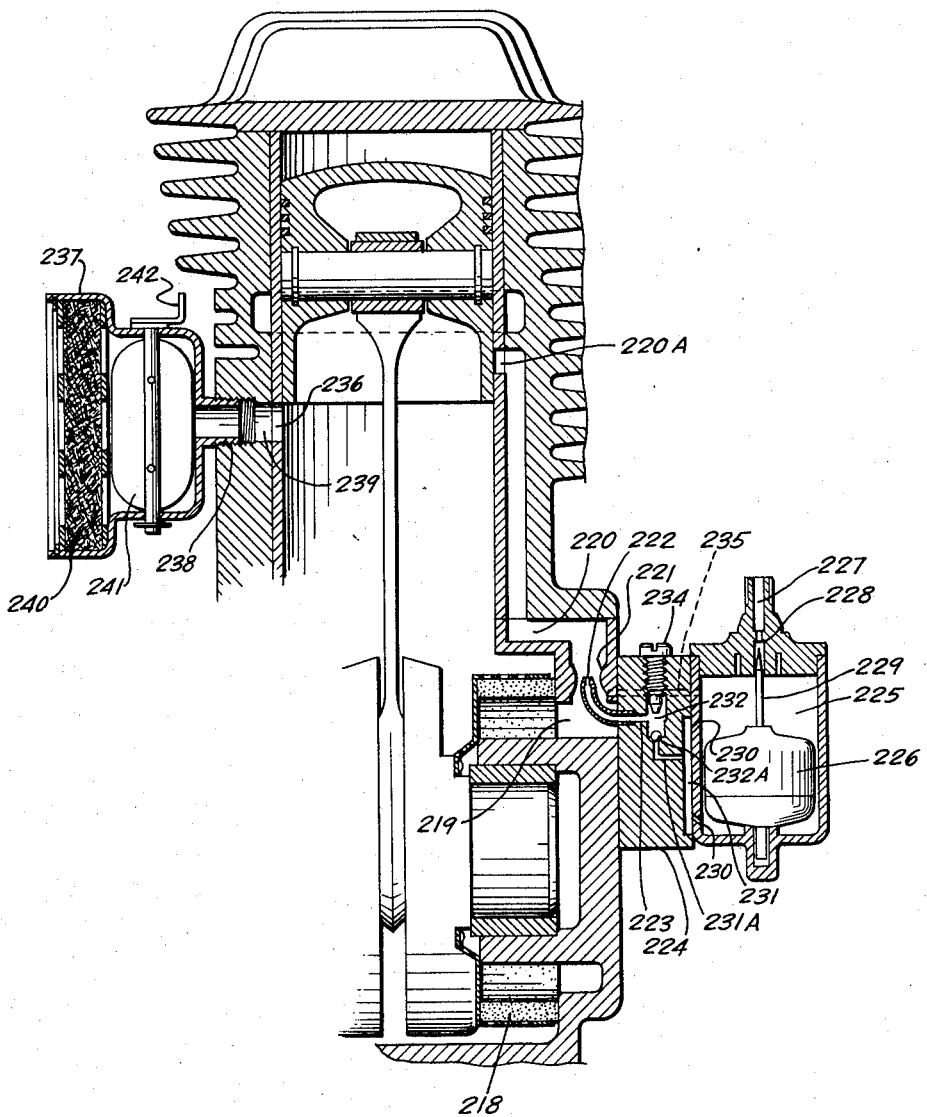
Figure 26:
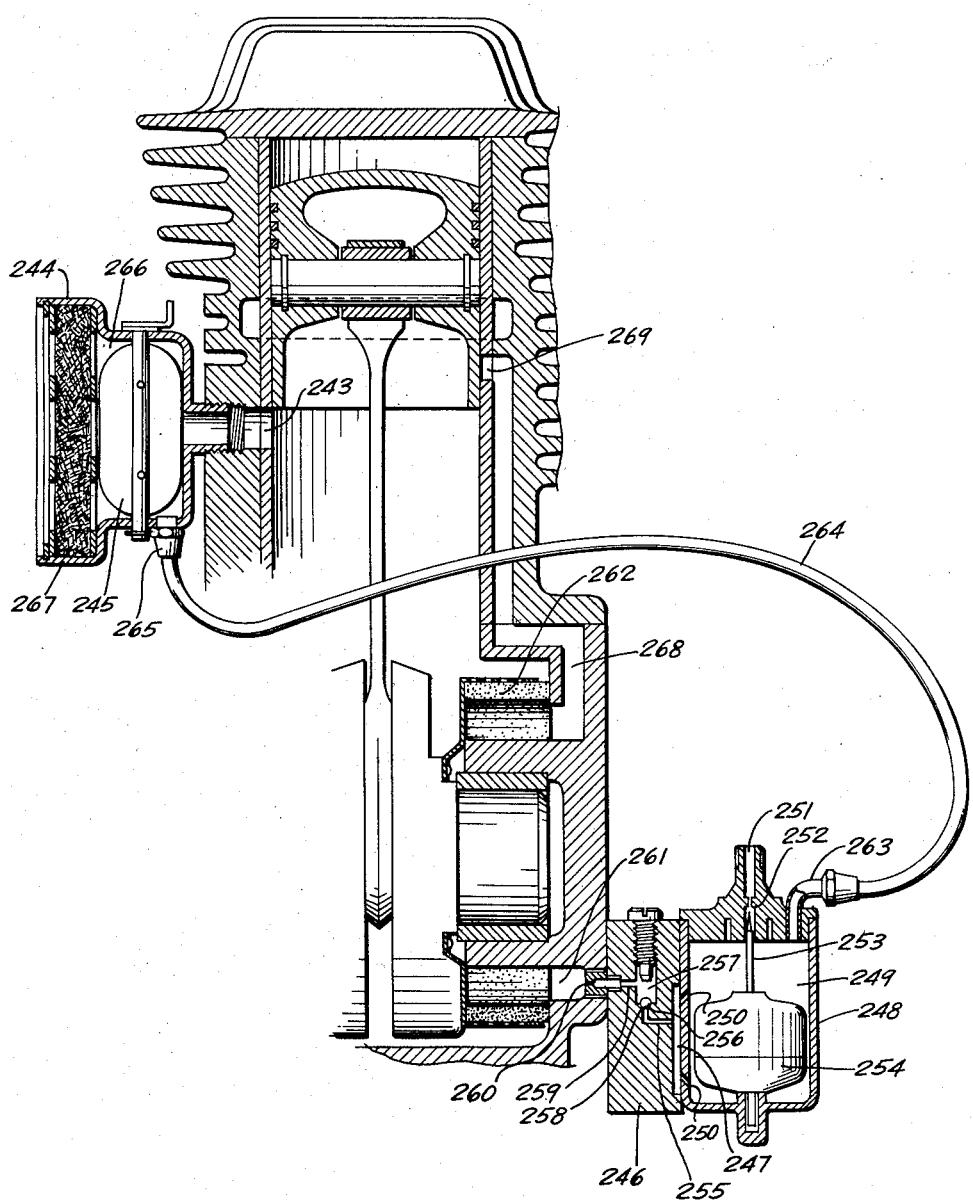

Fig. 18 is a vertical sectional view showing a further modified form of my invention;

Fig. 19 is a view partly in elevation and partly in section, and taken substantially on the line 19—19 on Fig. 18;

Figs. 20 and 21 are fragmentary views showing modified forms of rotary fillers that may be employed in my invention;

Fig. 21A is a detail view, drawn to an enlarged scale, showing the screen filter element employed in the arrangement shown in Fig. 21;

Fig. 22 is another vertical sectional view of an engine embodying yet another form of my invention;

Figs. 23 and 24 are vertical sectional views taken substantially and respectively on the lines 23—23 and 24—24 on Fig. 22;

Fig. 25 is a fragmentary vertical sectional view showing another modified form of my invention wherein fuel is introduced into the air to be supplied to the firing chamber after the air has passed through the novel filter of my invention;

Fig. 26 is a view similar to Fig. 25 showing a modified form of the arrangement illustrated in Fig. 25; and Fig. 27 is a view somewhat similar to Figs. 25 and 26 but showing my invention embodied in a Diesel type engine.

Referring to the accompanying drawings and first on the single cylinder two cycle engine illustrated in Figs. 1 to 7, inclusive, the engine includes a crank case 20 comprised of two sections 20A and 20B joined together along a vertically disposed parting line 21, bolts or the like (not shown) being utilized to secure the two parts together. The cylinder body 22 is mounted over the open upper end of the crank case 20 and is bolted or otherwise suitably secured thereto. A sleeve 23 in the body 22 affords the cylinder of the engine which is closed by the usual domed cylinder head 24 which is also bolted or otherwise suitably secured to the upper end of the cylinder body 22. Radiating fins as 25 are afforded on the periphery of the cylinder body 22 for cooling purposes as is customary.

The part 20B of the crank case 20 includes an outwardly projecting boss 26 having a bore extended therethrough in which a bearing as 27 is retained serving to journal the crank shaft 29 of the engine. A conventional packing 30 is associated with the bearing 27 outwardly thereof to seal the interior of the crank case so that pressure may be built therein and to prevent leakage past the bearing 27.

The crank arm 31 is mounted on the crank shaft 29 and is disposed in the crank case 20 and provides support for crank pin 32 on which the lower end of the connecting rod 33 is mounted. A counterweight 34 is provided on the crank shaft 29 in association with the crank arm 31 as is customary. A piston 35 is mounted at the upper end of a connecting rod 33 for reciprocation in the sleeve 23 in the course of rotation of the crank shaft 29. It will be appreciated that the engine as thus far described is of conventional design and it is to be understood that resort might be had to other arrangements in which the novel aspects of my invention could be incorporated.

An intake 36 is provided in the cylinder body 22 and a fuel and air mixture from a suitable carburetor or the like is supplied to this intake 36. The intake 36 leads to two ports 36A and 36B, Fig. 6, in the sleeve 23, and these ports are disposed along the extent of the sleeve 23 in such position that when the piston 35 is at the top of its stroke in the sleeve 23, the ports are disclosed so that the fuel and air mixture may flow therethrough into the crank case 20. Almost immediately after the start of the downstroke of the piston 35, the skirt thereof closes the ports 36A and 36B and, since the crank case 20 is sealed, the downstroke of the piston 35 compresses the fluid mixture that has been so admitted into the crank case. It will be noted that the interior configuration of the crank case 20 is so designed that minimum volume is afforded therein.

A passage 37 in the crank case 20 leads to a passage 38 in the cylinder body 22 and this passage terminates in ports 39, Fig. 5, formed in the sleeve 23 in such position that when the piston reaches the end of its downstroke, the passage 40 in the head of the piston 35 will be in communication with the ports 39, as shown in Figs. 1 and 5. At this time the compressed mixture in the crank case 20 flows through the passages 37 and 38 and through the ports 39 into the passage 40 from which it is discharged through the centrally located opening 41 provided in the head of the piston.

Additionally, when the piston 35 is at the bottom of its downstroke, ports 42, Figs. 1 and 4, formed in the sleeve 23 are disclosed and these ports open into an exhaust passage 43 which leads to the exhaust outlet 44 formed in the body 22. Thus, by the time the piston reaches the end of its downstroke, the exhaust ports 42 are disclosed and burned fuel from the preceding explosion in the cylinder flows through the ports 42, passage 43 and exhaust outlet 44 to be discharged from the cylinder.

Scavenging of the burned fuel from the firing chamber of the cylinder beneath the cylinder head 24 is facilitated by reason of the admission of the new fuel charge through the centrally located opening 41 in the head of the piston 35. This newly admitted fuel charge is under pressure and flows medially upward through the firing chamber and this has the effect of forcing the burned fuel down the cylinder walls to the ports 42 so that effective scavenging of the firing chamber is realized. The dome-shaped configuration of the cylinder head 24 also abets this scavenging action.

One of the important novel features of the engine shown in Figs. 1 to 7, inclusive, is the provision of a filter which is effective to remove any lubricant that may be entrained in the fuel and air mixture that is to flow from the crank case through the passage 37 as is explained hereinabove. Thus, it will be noted that the passage 37 is connected at its lower end to a port 45 provided in a hub member 46 that is secured in a recess in the wall of the crank case 20. The hub-like member 46 provides a shoulder 47 on which an annular disc 48 of felt or other suitable absorbent material is mounted for rotation. This filter member 48 is mounted in a shield which includes an annular wall 49 that is also rotatable about the shoulder 47. The aforesaid shield also includes a ring 50 and an inner wall 51. As best shown in Fig. 7, openings 52 are formed in the wall 49 in association with the filter 48. Also, openings 53 are formed in the ring 50 in alignment with the filter member 48. As best shown in Fig. 1, the pin 32 on which the connecting rod 33 is mounted, is extended so as to pass through the wall 51, filter member 48 and the wall 49 so that the shield and filter are arranged for rotation with the crank shaft 29 and about the shoulder 47. The wall 51 and the ring 50 are continuous and with the filter member 48 are effective to seal the interior of the crank case away from the port 45 so that communication between the interior of the crank case and the port 45 is only established through the openings 52 and 53 and the filter 48. Thus, as the fuel and air mixture flows from the crank case to the port 45, it passes through the filter 48 and entrained lubricant and the like are removed therefrom prior to the time the mixture flows through the passages 37 and 38 to the ports 39. Moreover, by reason of the fact that the filter 48 rotates about the shoulder 47, the resultant centrifugal force expels from the filter the lubricant and the like therein so that, therefore, the filter maintains its effective condition for protracted periods.

Another important novel aspect of the engine, shown in Figs. 1 to 7, is the lubrication thereof which is of such nature that it is unnecessary to mix lubricating oil with the fuel that is to be supplied to the engine as is customary in the operation of two cycle engines.

Referring to Figs. 1, 2 and 3, it will be seen that a reservoir 54 is formed in the lower part of the crank case 20 beneath the bottom wall 55 of the crank case. A sump 56, covered by a screen 56A, is formed in the lower wall 55 in the crank case 20 and lubricant supplied to the crank case may flow to this sump 56. An opening 57 of substantially capillary size is formed in the lower wall of the sump 56 and opens into the reservoir 54 into which a supply of lubricant is introduced through a closable opening (not shown) provided for this purpose.

A tapped opening 58 is provided in the wall 55 and a conventional tube clamp 59 is fitted thereinto to thereby secure the lubricant supply tube 60 in position. As best shown in Figs. 1 to 3, the upper part of the tube 60 is of arcuate configuration to conform to the outer wall of the counterweight 34 and the open upper end of the tube 60 is disposed in such position that lubricant flowing therefrom will pass to counterweight 34 to be thrown thereby on to the operating parts of the engine. The lower end of the tube 60 extends into the reservoir 54 and a valve housing 61 is provided at the lower end thereof. The valve housing 61 provides a valve seat 62 on which a ball valve member 63 may seat to close off flow through the inlet 64 of the valve housing 61.

The pressure built up in the crank case 20 as an incident to the downstroke of the piston 35 causes oil collected in the sump 56 to be forced therefrom into the reservoir 54 and as a result pressure is built up in the reservoir 54 and this pressure is, in effect, accumulated in the reservoir. Moreover, as the piston 35 moves from its lowermost position in the sleeve 23, immediately after pressure has been built up as aforesaid, a suction effect is created in the crank case. This results in lifting the ball valve 63 from the valve seat 62 and the suction effect in the tube 60, coupled with the accumulated pressure in the reservoir 54, causes lubricant to be withdrawn from the reservoir 54 through the inlet 64 and in this way a supply of lubricant is built up in the tube 60. Once the tube 60 has been filled with lubricant in this manner, then as an incident to each upstroke of the piston 35, some lubricant flows from the tube 60 onto the counterweight 34 and in the course of movement thereof is distributed to the operative parts of the engine.

An upstanding rib 65 is formed along the inner edge of the sump 56 and with the adjacent walls of the crank case 20 defines a well in which a pool of oil may collect. This well is disposed in such position that a finger 65A carried by the crank arm 31 may dip therein when the piston 35, in the course of reciprocation thereof, is in its lowermost position. In this way lubricant picked up from the pool is supplied to the operative parts of the engine.

The engine shown in Figs. 1 to 7, inclusive, may initially be set in motion by resort to any conventional form of starter, including manually operable means, and in the course of starting movement, when the piston 35 reaches its uppermost position, a mixture of fuel and air will be admitted through the passage 36 and ports 36A into the crank case 20 since, when the piston is in this position, the ports 36A are disclosed. In the course of the ensuing downstroke of the piston 35, the skirt thereof moves into position to close the ports 36A and in the course of the downstroke the charge of intermixed fuel and air admitted into the crank case 20 is compressed. Consequently, when the piston reaches the end of its downstroke, the fuel and air mixture in the crank case 20 will be under such compression that the same is forced through the filter 48 and openings 52 and 53 to the port 45 and thence through the passages 37 and 38 to the ports 39. When the piston reaches the end of its downstroke, the passage 40 in the head thereof is placed in communication with the ports 39 and as a result the compressed fuel and air mixture flows into the passage 40 and out through the opening 41 into the firing chamber beneath the cylinder head 24. In the ensuing upstroke of the piston 35, the fuel and air mixture admitted into the firing chamber is compressed therein and immediately after the piston 35 has reached its uppermost position in the sleeve 23, conventional means ignite the spark plug (not shown) associated with the firing chamber so that the compressed fuel and air is exploded to thereby bring about a power downstroke of the piston 35.

As the piston 35 moves downwardly in the course of the power stroke thereof resulting from the explosion of the fuel and air mixture in the firing chamber, the head of the piston moves into such position as to disclose the exhaust ports 42. Consequently, the residue from the ignited fuel and air mixture flows through the exhaust ports 42 and passage 43 to the exhaust outlet 44. As explained hereinabove, this scavenging of the firing chamber is augmented by the admission of a fresh fuel and air mixture into the firing chamber medially thereof through the opening 41 in the head of the piston 35.

It will be manifest from the foregoing that I have provided a two cycle internal combustion engine wherein the fuel intake port, the fuel supply port for the firing chamber and the exhaust ports are disclosed or closed in the course of reciprocation of the piston of the engine and at proper times in the course of such reciprocation. Moreover, even though the fuel and air mixture is admitted into the crank case to be compressed therein during the downstroke of the piston of the engine, the fuel and air mixture admitted to the firing chamber does not carry with it lubricant from the crank case for the reason that fuel and air mixture flows from the filter 48 so that any entrained lubricant is filtered therefrom.

It will also be manifest from the foregoing that as an incident to the reciprocations of the piston 35, lubricant is withdrawn from the reservoir 54 and is supplied to operative parts of the engine through the tube 60 in the manner described hereinabove.

The form of my invention shown in Figs. 8 to 17, inclusive, is somewhat akin to that described hereinabove, but in this instance, the novel aspects of my invention have been incorporated into a two cylinder, two cycle internal combustion engine. The engine so illustrated includes the crank case generally indicated by 66 which includes upper and lower parts 66A and 66B, respectively, which are united along a parting line 67 and which are secured one to the other by bolts as 68, Fig. 9.

The cylinder body 68 of the engine shown in Figs. 8 to 17, inclusive, has two bores provided therein in side-to-side relation in which sleeves 69 and 70 are respectively provided. Pistons 71 and 72 are respectively mounted in the sleeves 69 and 70 for reciprocation therein and these sleeves and the cylinder head 73 define the firing chambers afforded above the pistons in my novel two cylinder, two cycle engine. Spark plugs as 74, Fig. 14, are respectively associated with the firing chambers thus afforded and these spark plugs are ignited at appropriate times in the course of reciprocation of the pistons 71 and 72 by means conventionally provided for this purpose.

The crank case parts 66A and 66B afford oppositely located bosses 75 and 76 and a medially located sleeve 77. So-called oilless bearings sleeves or babbitt bearings or the like are provided in the bosses 75 and 76 and the sleeve 77 and a crank shaft 78 is journaled therein. The boss 75 is closed at its outer end and in order to seal the interior of the crank case, a conventional seal 79 is provided in the boss 76. The crank arms 80 and 81 on the crank shaft 78 have connecting rods 82 and 83 respectively connected thereto and these connecting rods are respectively connected to the pistons 72 and 71. Counterbalances 84 and 85 are respectively associated with the crank arms 80 and 81 for purposes well understood in the art.

In the instance of the engine shown in Figs. 8 to 17, inclusive, resort is had to sleeve bearings which, as stated, may be so called oilless bearings or these may be conventional babbitt bearings or the like. The reason for this is that I have provided a novel lubricating arrangement which insures that an ample supply of lubricant will be provided for the crank shaft bearings as well as other operative parts of my novel engine.

The web 86 which supports the sleeve 77 is, in cooperation with the bearing in the sleeve 77, effective to separate the crank case into chambers 87 and 88 which are respectively associated with the pistons 71 and 72. A sump 89 is provided in the lower wall 90 of the chamber 87 and is covered by a screen 91. Another sump 92 is provided in the lower wall 93 of the chamber 88 and is covered by screen 94. An opening 95 of substantially capillary size is provided in the lower wall of the sump 89 and leads to a reservoir 96 defined between the lower wall 90 and the bottom wall 97 of my novel engine. Another opening 98 of substantially capillary size is provided in the bottom wall of the sump 92 and leads to a reservoir 99 defined between the bottom wall 93 and the bottom wall 97. A rib 100, provided on the bottom wall 97, is effective to isolate the reservoirs 97 and 99 one from the other.

As best shown in Figs. 8 and 9, a tapped opening 101 is provided in the lower wall 90 which leads to a passage 102. A tube 103 extends through the passage 102 and the tapped opening 101 and is surrounded by a tube clamping fitting 104 which, when fitted into the tapped opening 101, is effective to clamp the tube 103 into position. The lower end of the tube 103 is disposed in the reservoir 96 and has a valve housing 105 provided at this end thereof. The valve housing 105 affords a valve seat 106 on which a ball valve 107 may seat. The upper end of the tube 103 is extended inwardly to be disposed in alignment with a counterbalance 85 associated with the crank arm 81. Another tube 108 is mounted in a manner similar to the mounting of the tube 103 and communicates with the chamber 99. This tube 108 has a valve housing like the valve housing 105 which similarly includes a valve seat and a ball valve. The upper end of the tube 108 is aligned with counterbalance 84 of the crank arm 80.

As has been explained hereinabove with reference to Figs. 1 to 8, as an incident to reciprocation of the pistons 71 and 72, respectively in the sleeves 69 and 70, pressure effects and suction effects are alternately afforded in the chambers 87 and 88. As an incident to a pressure effect in chamber 87, pressure is supplied through the opening 95 to the chamber 96 and as an incident to a pressure effect in the chamber 88, pressure is supplied to the reservoir 99 through the opening 98. The succeeding suction effect in the chamber 87 is effective to unseat the ball valve 107 and thereby lubricant is withdrawn from the reservoir 96 into and through the tube 103 to be supplied to the counterweight 85 and thence to operative parts of the engine associated with the chamber 87. As a result of corresponding and succeeding pressure and suction effects in the chamber 88, lubricant is supplied from the reservoir 99 to and through the tube 108 to the counterweight 84 to thereby be supplied to operative parts of the engine associated with this chamber 88.

A passage 109, Fig. 8, in the crank case part 66A communicates with the chamber 87. The passage 109 leads to a passage 111 which terminates in a port 112 in the sleeve 69. Passage 110 communicates with the passage 113 that leads to a port 114 in the sleeve 70. The port 112 is so located in the sleeve 69 that when the piston 71 attains its lowermost position in the course of a downstroke thereof, the passage 115 provided in the head of the piston communicates with the port 112 and thereupon a mixture of fuel and air that will have been compressed in the chamber 87 in the course of the downstroke of the piston will flow from this chamber through the passages 109 and 111, through port 112 into passage 115 to be discharged into the firing chamber above the piston 71, through the port 116 in the top wall of piston 71. A passage corresponding to the passage 115 is provided in the piston 72 and this passage communicates with the port 114 when the piston 72 reaches its lowermost position whereby a fuel and air mixture compressed during the downstroke of the piston will flow from the chamber 88 through passages 110 and 113 to the port 114 to thereby flow through the passage in the head of the piston and out into the firing chamber above the piston 72 through a medially located opening corresponding to the opening 116.

As has been explained with reference to Figs. 1 to 7, the admission of a compressed fuel and air mixture into the firing chamber medially thereof, assists in scavenging the firing chamber since the medially located charge tends to force the previously ignited mixture toward the exhaust ports 117 provided in the sleeve 69 or toward the exhaust ports 118 provided in the sleeve 70. The exhaust ports 117 are disclosed as the piston 71 moves toward and into its lowermost position and briefly during the upstroke of the piston. The exhaust ports 118 are similarly disclosed during reciprocation of the piston 72. The exhaust ports 117 lead to a passage 119 and the exhaust ports 118 lead to a passage 120. The passages 119 and 120 in turn lead to the exhaust outlet 121 of my novel engine.

An inlet port 122, Figs. 12, 14 and 15, is provided in the body 68 and an admixture of fuel and air which is supplied thereto from a carburetor or the like. The intake port 122 leads to an inlet port 123 provided in the sleeve 69 and disposed in such position that the same is disclosed when the piston 71 moves into its uppermost position shown in Fig. 15. When the port 123 is so disclosed, an admixture of fuel and air flows therethrough into the sleeve 69 beneath the piston 71 and then into the chamber 87. In the initial stages of the downstroke of the piston 71, the skirt thereof closes the port 123 and in the course of further downward movement of the piston, the admixed fuel and air admitted through the port 123 is compressed in the chamber 87.

As best shown in Fig. 12, the intake port 122 leads to an inlet port 124 provided in the sleeve 70 in a location similar to that of the port 123 in the sleeve 69. Hence, the port 124 is disclosed when the piston 72 moves into its uppermost position and an admixture of fuel and air is admitted into the chamber 88 to be compressed therein during the ensuing downstroke of the piston 72.

A rib 125 at one edge of the sump 89 cooperates with the adjacent walls of the crank case parts 66B to provide a well 126 in which a supply of lubricant may collect. A finger 127 on the crank arm 81 dips into a supply of lubricant collected in the well 126 in the course of movement of the crank arm 81 through its lowermost position and lubricant picked up by this finger is supplied to operative parts of my invention associated with chamber 87. A similar well 128 is provided in the chamber 88 and a finger 129 in the crank arm 80 dips into a supply of oil collected in this well in the course of the downward-most movement of the crank arm 80.

As a result of the lubricant supplied through the tubes 103 and 108 and that picked up by the fingers 127 and 129, a mist of lubricant will be present in the chambers 87 and 88 which will become admixed with a fuel and air mixture admitted to these chambers. It is undesirable that lubricant, which may become so entrained in the fuel and air mixture, pass to the firing chambers in the sleeves 69 and 70 and consequently I have provided a novel filter arrangement to separate entrained lubricant from fuel and air admixtures passing to the passages 109 and 110 respectively from the chambers 87 and 88.

To this end, a plate 130 is connected to the crank shaft 78 adjacent to the crank arm 81 and this plate includes in turn, a peripheral flange 131. A ring 132 of felt or other fibrous or suitable filtering material bears against the flange 131, adjacent part of the disc 130 and the adjacent wall of the chamber 87. Consequently, the filtering material 132 is interposed between the chamber 87 and the passage 109 so that the admixture of fuel and air admitted into and compressed in the chamber 87 must pass through the filter 132 in the course of flow thereof to the passage 109. Since the disc 130 and flange 131 and filtering material 132 rotate with the crank shaft 78, the filter 132 is subjected to centrifugal force which is effective to expel lubricant trapped in the filter out through the openings 133, Fig. 17, provided in the flange 131. Resultantly, the filter 132 is maintained in effective condition for protracted periods.

A disc 134 is mounted on the crank arm 80 and includes a flange 135 which supports a filter 136 which is interposed between the chamber 88 and the passage 110. The disc 134, flange 135, filter 136, are arranged similarly to and function similarly to the disc 130, flange 131 and filter 132 in the manner explained hereinabove.

Inasmuch as the filters 131 and 136 are interposed between the chambers 87 and 88 and the firing chambers to which fuel is supplied from these chambers and since these filters are effective to remove entrained lubricant from the fuel and air mixture supplied to the firing chambers, I am enabled to avoid an objectionable accumulation of carbon deposits in firing chambers of my novel two cycle engine. Consequently, frequent tearing down of the engine is avoided.

The form of my invention shown in Figs. 18 and 19 corresponds to that shown in Figs. 1 to 7, inclusive, but embodies a modification of the novel lubricating arrangement hereinabove described. Thus, referring to Figs. 18 and 19, the engine embodies a crankcase 140 which has a boss 141 at one side thereof. The crankcase also includes an end cover 142 that is bolted or otherwise secured in position of use. A conventional bronze sleeve bearing 140A is provided in the boss 141 and a similar bearing 140C is provided in a recess in the end cover 142 and, if desired, a so-called oil-less bearing might be used as the bearings 140A, and 140C. The crank shaft 143 is journalled in these bearings and includes a crank arm to which the lower end of a connecting rod 144 is connected. The upper end of the connecting rod is connected to a wrist pin 145 in the piston 146 that is reciprocal in the sleeve 147 provided in the cylinder body 148.

In the crankcase 140 a filter element, like that described hereinabove, is provided and this filter element includes a plate 149 mounted on the crank shaft 143 to rotate therewith. A flange or band 150 is provided at the periphery of the plate 149 and has a plurality of openings 151 formed therein. A ring of suitable filtering material 152 is mounted inwardly of the flange 150 and the arrangement is such that this filtering material is interposed between the interior of the crankcase 140 and the port 153 provided at the lower end of a passage 154 that leads to a passage 155 and terminates in a port 156 in the sleeve 147 in position to be disclosed as the piston moves into its lowermost position in the course of reciprocation thereof in the sleeve 147. The port 153 and the passages 154 and 155 afford what is referred to as a transfer passage. In order to prevent leakage past the rotary filter comprising the plate 149, ring 150 and filtering material 152, a sealing ring 157 is provided which bears on the outer periphery of the ring 150 and which engages adjacent portions of the end cover 142 of the crankcase 140.

A reservoir 158 is provided beneath the lower wall 159 of the crankcase 140. An opening 160 is formed in the wall 159 and a tube 161 is mounted in this opening to project for a predetermined distance above the inner face of the lower wall 159, the lower end of the tube 161 leading into the reservoir 158. Lubricant supplied to the crankcase 140 collects in the lower part thereof and when the level of the lubricant so collected is above the upper end of the tube 161 the lubricant flows through this tube into the reservoir 158.

An opening 162 is provided in the wall of the crankcase 140 and is enlarged and tapped at its lower inner end so that when a tube 163 is passed through the opening 162, to extend into the reservoir 158, a tube fitting 164 may be seated in the enlarged tapped portion of the opening 162 to clamp the tube 163 into position. A valve housing 165 is provided at the lower end of the tube 163 and provides in the lower wall thereof a valve seat 166 on which a ball valve member 167 may seat. A supply of lubricant is introduced into the reservoir 158 through a closable opening (not shown) and the position of the lower end of the valve housing 165 is such that when a proper supply of lubricant has been introduced into the reservoir 158, the lower end of the valve housing 165 will be disposed well below the top level of the lubricant supply in the reservoir 158.

As in the instance of the engines described hereinabove, an inlet passage 168 extends through the cylinder body 148 and terminates in the cylinder bore an inlet port 169. A conduit or the like (not shown) leads from a suitable source of fuel, which may be a carburetor, to the passage 168 and the arrangement is such that as the piston approaches the upper end of its stroke in the sleeve 147 the port 169 will be disclosed so that desirably an admixture of air and fuel will be admitted into the sealed crankcase 140 to be compressed therein in the ensuing downstroke of the piston.

Under certain circumstances as, for example, when the engine is cold, fuel admitted through the port 169 may tend to condense and run down over the portion of the cylinder wall beneath the port 169. Should this occur the film of lubricant on the cylinder wall adjacent to the port 169 may be washed away thereby exposing the cylinder wall to the wall of the piston and this could possibly result in seizing of the piston and could be otherwise objectionable. Therefore, in order to insure that a supply of lubricant will be maintained on the cylinder wall, and especially on the portion thereof immediately beneath the port 169, I provide a passage 170 in the cylinder housing 148 which leads to a port 171 in the sleeve 147, said port 171 being located immediately beneath the port 169. The passage 170 leads from an enlarged tapped opening 172 provided in the cylinder wall 147 and a tube fitting 173 is adapted to be secured in this enlarged tapped opening to thereby secure in position the upper end of the lubricant supply tube 163.

As an incident to each upstroke of the piston 146 in the sleeve 147 a suction effect will be induced in the crankcase 140 and this is effective to unseat the ball valve 167 from the valve seat 166 and thereupon lubricant is withdrawn from the supply thereof in the reservoir 158 into the tube 163. In the course of downstroke of the piston the ball valve 167 re-seats on the valve seat 166 and thereby prevents lubricant in the tube 163 from flowing back into the reservoir 158. Thus, in the course of operation of the engine, a supply of lubricant will be built up in the tube 163. When the piston 146 is near the uppermost position thereof attained in the sleeve 147, the port 168 is disclosed and lubricant then flows onto the wall of the cylinder to thereby insure a supply of lubricant on the wall of the cylinder adjacent to the port through which fuel is admitted to the crankcase. Lubricant so supplied to the cylinder wall flows down and around the same and onto operative parts of the engine in and associated with the crankcase so as to thereby be supplied to the operative parts of the engine. If desired, a finger or scoop like the finger 65A, Figs. 1 and 2, may be associated with the connecting rod or crank on the crankshaft to dip into the supply of lubricant collected at the bottom of the crankcase so that this lubricant will be picked up and then splashed onto operative parts of the engine.

By reason of the effective lubrication which I afford in my novel engine, I am able to resort to the conventional bearings rather than so-called anti-friction of the ball or roller type which enables my novel engine to be manufactured economically. By reason of the effective lubrication which I afford, a mist of lubricant will be maintained in the crankcase in the course of operation of the engine, and even though an admixture of fuel and air is admitted into the crankcase to be compressed therein in the course of the downstrokes of the piston, the lubricant is prevented from passing to the firing chamber in the cylinder above the piston by reason of the interposition of the rotary filter element between the crankcase and the firing chamber. Inasmuch as the filtering element is in rotation in the course of operation of the engine, centrifugal force will be effective to throw off lubricant picked up thereby and this lubricant will flow back into the crankcase to be returned to the reservoir 158, as explained hereinabove. Thus the rotation of the filter renders the same self-cleaning so that the filter will remain effective over protracted periods.

The rotary filters thus far described that are attached to the crankshaft to rotate therewith have each included a fibrous filter element of felt or similar material. In some circumstances, however, it may be advantageous to eliminate such fibrous material, and in Figs. 20 and 21 I have illustrated forms of rotary filters that enable this to be accomplished.

Thus, referring to Fig. 20, as in the instance of the filters thus far described, a disc or plate 175 is provided which has a flange or ring 176 at the periphery thereof. Desirably such an element may be formed by a drawing or spinning operation. The medial part of the plate 175 is connected to a crankshaft to rotate therewith. This filter is positioned to be effective to remove entrained lubricant and the like from the fluid flowing from a sealed crankcase to a transfer passage as 177 which leads an intake port in the cylinder as described hereinabove. Slots as 178 are formed at spaced intervals in the ring or flange 176, these slots being of restricted width so as to preclude lubricant or the like from passing therethrough but which, nevertheless, permit the free flow therethrough of a fluid such as an admixture of air and fuel. The centrifugal force attendant to rotation of the filter element causes lubricant or the like trapped by the filter element to be thrown therefrom so that the lubricant may return to the supply thereof maintained at the bottom of the crankcase.

A further modified form of filter is shown in Fig. 21 and here again a disc or plate 179 is provided which is fast to the adjacent end of the crankshaft. A flange or ring 180 is provided at the periphery of the plate 179 to extend in right angular relation therewith. As in the instances described hereinabove, openings 181 are provided in relatively close relation in the flange or ring 180. Inwardly of the flange or ring 180 a corrugated screen as 182 is provided which is in the form of a ring and which is engaged with the inner face of the flange 180. The screen 182 preferably embodies a plurality of layers or laminations related one to the other as shown, by way of example, in Fig. 21A. Advantageously, a sealing arrangement as 183 is associated with the flange or ring 180 to prevent leakage past the filter. If desired, a similar sealing arrangement could be associated with the filter shown in Fig. 20.

A further modified form of my novel engine is shown in Figs. 22 to 24, inclusive, and referring thereto I have provided an engine which includes a crankcase 185 divided into sections 185A and 185B along a parting line 185C, the sections 185A and 185B being bolted or otherwise suitably secured together. A recess 186 is provided in the section 185B in which a sleeve bearing 187 is secured, this bearing being of bronze or like material and, if desired, this sleeve may be so-called oil-less bearing formed from powdered metal or the like. A recess 188 is formed in the section 185A and has a sleeve bearing 189 mounted therein which is similar to the sleeve bearing 187. A crankshaft 190 includes portions respectively disposed in the bearing sleeves 187 and 189 so as to be rotatable therein, and one end of the crankshaft is extended outwardly of the portion 185A of the crankcase to afford a power take-off. A sealing member 189A is provided to seal against leakage along the crankshaft whereby a sealed crankcase is afforded.

A cylinder body 191 has the lower open end thereof disposed on the upper end of the crankcase 185 and the cylinder body is bolted or otherwise suitably secured to the crankcase. A piston 192 is reciprocal in the cylinder afforded in the cylinder body 191 and one end of a connecting rod 193 is connected to the piston in a conventional manner. The other end of this connecting rod is connected to the crank or throw of the crankshaft 190 which is disposed thereon intermediate the portions of this crankshaft journaled in the bearings 187 and 188.

A groove 194 is formed in the upper part of the crankcase 185 and passages 195 and 196 formed in the cylinder wall 191, preferably in diametrically opposed relation, communicate with the groove 194. A transfer passage 196A leads from the lower end of the groove 194 to a port 197A formed in the crankcase.

As in the instances of forms of my invention described hereinabove, a rotary filter is interposed between the interior of the crankcase 185 and the port 197A. In this instance, this rotary filter includes a plate 198 that is bolted or otherwise suitably secured to the crankshaft 190 to rotate therewith and a flange or ring portion 199 is provided at the periphery of the disc 198 and is extended in right angular relation therewith. A suitable filtering medium 200, such as described hereinabove, is disposed to engage the inner face of the flange or ring 199 which has openings formed therein as in the instance of similar arrangements described hereinabove. The filter element cooperates with adjacent portions of the crankcase so that communication between the interior of the crankcase and the port 197 can only be effected through the openings in the flange 199 and the filtering medium 200.

The passages 195 and 196 terminate in intake ports as 201 and 202 in the cylinder wall and these ports are so located that as the piston approaches the lowermost position thereof in the course of reciprocation in the cylinder, these ports will be disclosed. Exhaust ports as 203 are provided in the cylinder wall in position to be disclosed by the piston in the course of a downstroke thereof following the explosion of an air and fuel mixture in the firing chamber in the cylinder above the piston. Preferably the ports 201 and 202 are so directed that fluid admitted therefrom swirls up over the wall of the cylinder in such a way as to expedite scavenging of an ignited fuel mixture from the firing chamber and the movement imparted to the fuel admitted into the firing chamber from the ports 201 and 202 tends to force the burnt gases out through the exhaust ports as 203.

In this form of my invention an opening 204 is provided in the portion 185B of the crankcase 185 and this opening is so disposed that the inner end thereof is normally closed by the plate 198 of my rotary filter element. The outer end of the opening 204 may communicate with the atmosphere preferably through a conventional air cleaner (not shown) or, if desired, a carburetor or the like may be provided to supply an admixture of air and fuel to the port 204. An elongated arcuate opening 205 is provided in the plate 198 in position to register with the inner end of the port 204 in the course of rotation of the disc 198 with the crankshaft 190. Desirably the arrangement is such that the leading end of the opening 205 moves into registration with the port 204 immediately after the piston has moved upwardly sufficiently to close off the ports 201 and 202, and this will occur approximately 20° after the piston moves from its lowermost dead center position in the course of an upstroke of the piston. The opening 205 is of sufficient length to continue in communication with the port 204 until just prior to the time the piston starts its downward movement in the course of reciprocation thereof in the cylinder. In this way a rather appreciable period of time is afforded during which fluid flowing through the port 204 may be admitted into the crankcase 185.

It is advantageous to effectively compress fluid admitted into the crankcase 185 and in order to augment the compression that is effected during the downstroke of the piston, I provide, a blower arrangement in association with the opening 205. To this end an arcuate plate 206 is disposed in spaced relation with the portion of the plate 198 where the opening 205 is formed. Laterally extending blades or fins 207 are disposed between the plates 198 and 206, which blades, as best shown in Fig. 24, are inclined relatively to one another so that the space therebetween is greater at the periphery of the disc 198 than is the spacing between the blades at the inner ends thereof, the inner ends of such blades being disposed to extend beyond the opening 205. Hence, fluid admitted from the port 204 through the opening 205 is caused to flow between the blades 207 which act as a centrifugal blower and which therefore have the effect of compressing fluid admitted into the crankcase 185. The compression thus effected, taken with the compression resulting from the downward movement of the piston, very effectively compresses fluid in the crankcase 185 and this assures rapid flow of fluid from the crankcase to the ports 201 and 202 when these are disclosed so that, in effect, a compressed admixture of air and fuel is admitted into the firing chamber prior to the time the piston moves to close the ports 201 and 202.

The operative parts of the engine illustrated in Figs. 22 to 25, inclusive, are effectively lubricated by an arrangement akin to that described hereinabove. Thus a sump or well 208 is formed in the upper face of the lower wall 209 of the crankcase 185. A reservoir 210 is afforded beneath the wall 209 of the crankcase 185. An overflow pipe 211 extends through the wall 209 and the upper end thereof is so spaced from the upper wall of the sump 208 that a supply of lubricant may collect in the sump. When, however, the supply of lubricant in the sump rises above the upper end of the overflow pipe 211, the lubricant then flows through this pipe into the reservoir 210.

As best shown in Fig. 23, an opening 212 is provided in the lower wall 209 of the crankcase and the lower end of this opening is enlarged and tapped so that a tube fitting may be secured therein, such fitting being effective to secure a tube 213 in position to have the upper end thereof disposed above the lower wall 209 of the crankcase and at one side thereof. A valve housing 214 is provided in the lower end of the tube 213, which extends into the reservoir 210 and terminates in closely spaced relation with the bottom wall of the reservoir. A valve seat 215 is provided in the valve housing 214 and a ball valve 216 is adapted to seat thereon. In the course of an upstroke of the piston a suction effect is created in the crankcase 185 and this is effective to unseat the ball 216 from the seat 215 and thereupon lubricant flows into the tube 213. In the course of downward movement of the piston, when fluid in the crankcase 185 is placed under compression, the ball valve 216 is forced into engagement with the valve seat 215 so that lubricant drawn into the tube 213 is trapped therein. Thus, in the course of successive reciprocations of the piston, a supply of lubricant is built up in the tube 213, and after this tube has been filled, lubricant discharges from the upper end of the tube onto operative parts of the engine in the crankcase to effect lubrication thereof. A finger 217 on the throw of the crankshaft dips into the lubricant in the sump 208 and this is effective to splash lubricant onto operative parts of the engine which are therefore effectively lubricated, and this enables me to restort to conventional sleeve bearings rather than relatively expensive ball or roller bearings conventionally provided for the crankshaft, connecting rod and wrist pin in two-cycle engines.

By reason of the effective lubrication afforded in this form of my invention a lubricant mist will be present in the crankcase 185 so that lubricant may tend to be entrained in fluid admitted into the crankcase from the port 204 in the manner described hereinabove. However, by reason of the interposition of the rotary filter between the interior of the crankcase and the port 197 any such entrained lubricant will be removed from the fluid and returned to the crankcase so that the compressed fluid supplied to the firing chamber will be free of entrained lubricant and the like.

In instances where, as in the engine shown in Figs. 22 and 23, a bearing for the crankshaft is located beyond the filter, it is advantageous to so arrange the filter structure that some lubricant will be supplied to such a bearing, particularly since the novel filter of the present invention will otherwise effectively prevent the passage of lubricant to such a bearing. Thus, referring to Figs. 22 and 24, in order to afford a supply of lubricant to the bearing 187, the plate 198 of my novel filter has the medial portion thereof offset in a direction opposite to the ring or flange 199 so that the medial portion of the plate is connected to the peripheral portion thereof through an inclined section 198A. An opening is provided in such offset portion of the pltae and a portion of the crankshaft is passed therethrough and the marginal portion about this opening is riveted or otherwise attached to the crankshaft. Openings as 199A are formed at spaced intervals in the inclined portion 198A, there being, in the present instance, four such openings 199A as shown in Fig. 24. Lubricant in the crankcase passes through such openings to the bearing 187 and affords lubrication therefor. It will be advantageous to resort to an arrangement similar to this in each instance where a bearing as 187 is located on the outlet side of the filter.

With reference to the various forms of my invention thus far described, I have explained that an admixture of air and fuel may be admitted into the crankcase of the engine to be compressed therein in the course of the down stroke of the piston. In such arrangements, throttling of the engine is effected by conventional means associated with the carburetor or the like affording the admixture of air and fuel. It is possible that the novel engine of my invention may be utilized under severe operating conditions, as for example, under temperatures well below freezing. In such circumstances and until the engine has operated for a sufficient period of time to have various elements of the engine become heated, fuel admitted along with the air to the crankcase may tend to condense therein and such condensed fuel would be mixed with the lubricant supply in the crankcase which might result in objectionable dilution of the lubricant. In order to avoid such dilution and because in many other circumstances it may be advantageous so to do, fuel may be supplied to the engine by being introduced into the transfer passes extending between the crankcase and the inlet port afforded in the cylinder wall. In such circumstances, air would be admitted to the crankcase to be compressed therein and such air would be caused to pass through a rotary filter element, such as has been described hereinabove, to have entrained lubricant and the like removed therefrom before flow thereof to the intake port in the cylinder wall.

One arrangement to which resort may be had to enable fuel to be supplied to air flowing from the filter element to the intake port in the cylinder wall is illustrated in Fig. 25. In this instance, a filter element 218, which may be arranged in any of the ways described hereinabove, is provided and is arranged to rotate with the crankshaft of the engine. A port 219 is provided in the wall of the crankcase so that fluid flowing through the filter element may pass thereto and thence through a transfer passage 220, akin to those described hereinabove and leading to an intake port 220A in the cylinder wall.

Desirably a venturi sleeve 221 is mounted in the lower part of the transfer passage 220 and a jet 222 disposed in the throat of the venturi affords a source of fuel. In the present instance the jet 222 leads from the outlet passage 223 formed in the body 224 of a carburetor arrangement that is secured to an adjacent side of the crankcase of the engine embodying this form of fuel supply. The carburetor arrangement includes a chamber 225 in which a float 226 is mounted. A fuel inlet passage 227 leads to a valve seat 228 adapted to be engaged by the needle valve member 229. Thus, when a predetermined quantity of liquid fuel has been admitted into the chamber 225 the float will rise to such a position that a valve member 229 will engage the seat 228 to shut off fuel flow through the inlet 227 to the chamber 225. When the fuel level in the chamber 225 falls, the needle valve 229 is retracted from the valve seat 228 and additional fuel is admitted to the chamber 225. Ports as 230 lead from the chamber 225 to a restricted chamber 231 and a passage 231A leads from this chamber to a storage chamber 232 with which the outlet passage 223 communicates. A ball check valve 232A cooperates with a valve seat at the end of the passage 231A in the chamber 232 and prevents retroactive flow through the passage 231A so that a supply of liquid fuel may be maintained in the chamber 232. An opening leads into the upper end of the chamber 232 and is closed by a screw 234 which may be removed to facilitate cleaning of the carburetor arrangement. A passage 235 leads from the transfer passage 220 to the chamber 225 to afford free communication between the crankcase of the engine and the chamber 225 whereby the pressure in the crankcase and chamber 225 is equalized.

When resort is had to the carburetor arrangement like that disclosed in Fig. 25 air may be admitted to the crankcase either through a port as 204, Fig. 22, and an elongated opening as 205, Fig. 24, or an inlet port as 236 may be afforded in the cylinder wall in position to be disclosed when the piston in this particular cylinder is near or in the uppermost position thereof attained in the course of reciprocation thereof in the cylinder. A housing as 237 including a sleeve as 238 may be provided and such sleeve is desirably mounted in a passage 239 leading to the port 236. A conventional air cleaner or filter means 240 is desirably provided in the housing 237 to remove dust and other foreign matter from air admitted into the housing 237 to be supplied through the passage 239 to the port 236. A conventional butterfly valve 241 is provided in the housing 237 and suitable means as 242 are provided to adjust the position of this butterfly valve so as to thereby regulate air flow through the passage 239 and port 236, such adjustment of the air supply effecting throttling of the engine.

Other than the foregoing, the engine shown in Fig. 25 is arranged in a manner similar to that described hereinabove. Thus air supplied to the crankcase of the engine will be compressed therein and will pass through the filter 218 to the port 219 and thence through the venturi 221 to aspirate fuel from jet 222 so that an admixture of air and fuel may flow through the transfer passage 220 to the intake port 220A in the cylinder wall which will be disclosed during the time the piston is near and in the lowermost position thereof attained in the course of reciprocation of the piston. As stated hereinabove, throttling of the engine shown in Fig. 25 may be effected by adjustment of the butterfly valve 241.

Another form of arrangement whereby fuel may be introduced into the air flowing from the novel filter of my invention to a transfer passage is illustrated in Fig. 26. In this instance, an arrangement like that shown in Fig. 25 is provided to afford a source of air to the crankcase of the engine, and in this instance air is admitted to the crankcase through an intake port 243 similar to the intake port 236, air passing to the intake port 243 through an air filter or cleaner 244 past a butterfly valve 245 that is similar to the butterfly valve 241 described hereinabove.

In this instance a carburetor arrangement is provided which includes a body 246 having a restricted chamber 247 therein and is disposed adjacent a body 248 affording a float chamber 249, communication between the chambers 247 and 249 being established through port as 250. A fuel intake passage 251 leads to a valve seat 252 adapted to be engaged by a needle valve 253 mounted on a float 254 disposed in the float chamber 249, this arrangement corresponding to that described hereinabove with reference to Fig. 25.

A passage 255 leads to a valve seat 256 at the lower end of a chamber 257, a ball check valve 258 cooperating with the valve seat 256 to prevent retroactive flow through the passage 255. A passage 259 leads from the chamber 257 to an outlet opening 260 that leads to a chamber 261 formed in the crankcase and disposed in such position that air flowing from the crankcase of the engine may pass to the chamber 261 after having been filtered by flowing through a rotary filter as 262 which may be in the nature of the filter that has been described hereinabove.

In the form of the invention shown in Fig. 26 it is desirable that pressures corresponding to those obtained behind the butterfly valve be maintained in the float chamber 249, and to this end a fitting 263 communicates with the upper part of the chamber 249. A tube 264 leads from the fitting 263 to a fitting 265 that communicates with a chamber behind the butterfly valve in the housing 267, the butterfly valve 245 being disposed in the chamber 266.

It will be noted that the outlet 260 communicates with the chamber 261 in such position that liquid fuel flowing from the outlet 260 into the chamber 261 may pass onto the lower portion of the filter 262. In the course of the upstroke of the piston of the engine with which the arrangement shown in Fig. 26 is associated, a suction effect will be induced in the crankcase and this will be effective to withdraw fuel from the float chamber 249 past the ball check valve 258. During the downstroke of the piston, when a pressure effect is induced in the crankcase, the ball valve 258 will engage the valve seat 256 to thereby entrap liquid fuel in the chamber 257. Liquid fuel flowing from the chamber 261 onto the filter 262 will be picked up by air flowing from the crankcase of the engine through the filter 262 to the transfer passage 268 which leads to an intake port 269 disposed in the cylinder in position to be disclosed when the piston is near or in the lowermost position thereof attained in the course of reciprocation thereof in the cylinder. As in the instance of the engine shown in Fig. 25, throttling of the engine shown in Fig. 26 may be effected by adjustment of the valve 245.

The novel filter of the present invention may be advantageously incorporated in a diesel type engine. An arrangement of this character is shown in Fig. 27 where I have illustrated an inlet port 270 in the cylinder wall in position to be disclosed when the piston is near or in thte uppermost position thereof attained in the course of reciprocation thereof in the cylinder. A passage 271 leads to the intake port 270 and air is supplied to the passage 271 through an air cleaner 272 past a butterfly valve 273. While I have illustrated in Fig. 27 an intake port 270 in the cylinder wall, it will be understood that in instances of this kind resort could be advantageously had to an arrangement like that shown in Fig. 22 whereby air supply to the crankcase would be afforded by a passage like the passage 204 in the crankcase and a slot as 205 would be afforded in the plate 274 of my novel rotary filter element 275, an arrangement of this character having been described hereinabove with reference to Figs. 22 and 24. Moreover, a blower arrangement like that shown in Fig. 24 may be advantageously employed especially in an instance where air is admitted to the crankcase through a passage corresponding to the passage 204.

Air compressed in the crankcase of the engine shown in Fig. 27 will flow through the filter 275 and transfer passage 276 to an intake port as 277 which is disclosed when the piston is near or in the lowermost position thereof attained in the course of reciprocation thereof in the cylinder. A fuel injector 278 of conventional design causes fuel to be supplied to the firing chamber of the engine through an intake nozzle 279, such injection of the fuel into the firing chamber being timed to take place in the course of the upstroke of the engine, and after air has been admitted to the area above the piston through the intake port 277. Throttling of the engine shown in Fig. 27 may be effected by adjustment of butterfly valve 273 and desirably the means controlling the position of the butterfly valve 273 will also be arranged to control the fuel injector 278 to regulate the fuel supply along with regulation of the air supply.

An engine such as those shown in Figs. 25, 26 and 27 will advantageously be lubricated in the manner described hereinabove so that a supply of lubricant will be maintained in the crankcase of the engine. Moreover, since lubricant will be supplied to moving parts of the engine in the crankcases some lubricant will be thrown therefrom so that a mist or fog of lubricant will be present in the crankcases. Some such lubricant may become entrained in fluid compressed in the crankcases of the engine but any such entrained lubricant will be removed from the fluid as the same flows through the novel rotary filter element afforded in the engine so that, therefore, lubricant does not pass from the crankcases of the engines to the firing chambers thereof.

It will be manifest from the foregoing description that I have provided an arrangement whereby effective lubrication of the operative parts of a two-cycle internal combustion engine may be so effected that resort may be had to conventional sleeve bearings so that resort need not be had to the relatively expensive so-called anti-friction bearings that have heretofore customarily been included in two-cycle internal combustion engines. Such effective lubrication of the operative parts of a two-cycle internal combustion engine may produce a mist or fog of lubricant in the crankcases so that air, and a mixture of air and fuel, or other fluid compressed in the crankcases may pick up lubricant in the course of compression thereof. However, by resort to the novel rotary filter means I have described hereinabove, entrained lubricant and the like will be effectively removed from fluid compressed in the crankcase of the engine in which the filter is included so that fluid passing from the crankcase through a transfer passage to a firing chamber of the engine will be freed from entrained lubricant and this enables prolonged operation of the novel engine of my invention to be realized since removal of entrained lubricant and the like from fluid supplied to the firing chamber of such an engine will mitigate against the collection of objectionable carbon deposits and the like in the firing chamber of the engine.

The centrifugal force attendant to operation of a rotary filter in the nature of those described hereinabove will be effective to throw off lubricant and the like picked up by the filter. Therefore, such a filter will remain effective over protracted periods.

It will be manifest from the foregoing description that I have provided arrangements which enable the hereinabove set forth and kindred objections of this invention to be realized, and while I have illustrated and described the preferred embodiments of my invention, it is to be understood that these are capable of variation and modification.

I claim:

1. A two cycle internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, filter means rotatable with said crankshaft and interposed between the crankcase and said transfer passage for filtering entrained lubricant or the like from said compressed fluid prior to the passage thereof from the crankcase to said firing chamber, means for incorporating combustible constituents into said fluid, and means for igniting said combustible constituents of said fluid in said firing chamber.

2. A two cycle internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, a plate mounted in the crankcase for rotation with the crankshaft and embodying filter means interposed between the crankcase and the transfer passage for filtering entrained lubricant or the like from said compressed fluid prior to the passage thereof from the crankcase to the transfer passage, means for incorporating combustible constituents into said fluid, and means for igniting said combustible constituents of said fluid in said firing chamber.

3. A two cycle internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, a plate mounted on the crankshaft within the crankcase for rotation therewith and embodying filter means interposed between the crankcase and the transfer passage for filtering entrained lubricant or the like from said compressed fluid prior to the passage thereof from the crankcase to the transfer passage, means for incorporating combustible constituents into said fluid, and means for igniting said combustible constituents of said fluid in said firing chamber.

4. A two cycle internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, a plate mounted on the crankshaft within the crankcase for rotation therewith, a flange on the periphery of said plate disposed normal to the plate and having openings therein of a restricted size affording a filter means in the crankcase rotating with the crankshaft for filtering entrained lubricant or the like from said compressed fluid prior to the passage thereof from the crankcase through the filter means to the transfer passage, means for incorporating combustible constituents into said fluid, and means for igniting said combustible constituents of said fluid in said firing chamber.

5. A two cycle internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, a disc mounted on the crankshaft within the crankcase for rotation therewith, filter means associated with the disc and interposed between the crankcase and the transfer passage for filtering entrained lubricants or the like from said compressed fluid prior to the passage thereof from the crankcase to the transfer passage, an annular flange on the disc surrounding the filter means and having openings therein for admitting compressed fluid in the crankcase to the filter means, means for incorporating combustible constituents into said fluid, and means for igniting said combustible constituents of said fluid in said firing chamber.

6. A two cycle internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage having a port opening into the crankcase and leading to the firing chamber in the cylinder above the piston for directing compressed fluid from the crankcase to said firing chamber, an annular shoulder in the crankcase bordering said port, an annular filter means mounted for rotation on said shoulder to filter entrained lubricant from the compressed fluid in the crankcase prior to the passage thereof through said port to the transfer passage, means connecting the filter means to the crankshaft for rotation therewith, means for incorporating combustible constituents into said fluid, and means for igniting said combustible constituents of said fluid in said firing chamber.

7. A two cycle internal combustion engine including a crankcase, a crankshaft rotatable in the crankcase, a cylinder which communicates with the crankcase and a piston reciprocable in the cylinder, a port in the cylinder wall under control of the piston for admitting fluid into the crankcase to be compressed therein as an incident to the down stroke of the piston, means affording a transfer passage having a port opening into the crankcase and leading to the firing chamber in the cylinder above the piston for directing compressed fluid from the crankcase to said firing chamber, an annular shoulder in the crankcase bordering said port opening of said transfer passage, an annular filter means mounted for rotation on said shoulder to filter entrained lubricant from the compressed fluid in the crankcase prior to the passage thereof through said port to the transfer passage, means connecting the filter means to the crankshaft for rotation therewith, means for incorporating combustible constituents into said fluid, and means for igniting said combustible constituents of said fluid in said firing chamber.

8. A two cycle internal combustion engine including a crankcase, a crankshaft rotatable in the crankcase, a cylinder which communicates with the crankcase and a piston reciprocable in the cylinder, passage means in the wall of the crankcase for admitting fluid to the interior of the crankcase to be compressed therein by the piston during the downstroke thereof, means affording a transfer passage between the firing chamber in the cylinder and said crankcase for directing fluid compressed in said crankcase to said firing chamber in the cylinder above the piston for combustion, a plate mounted in the crankcase for rotation with the crankshaft and embodying filter means interposed between the crankcase and said transfer passage for filtering entrained lubricant or the like from the compressed fluid in the crankcase prior to the passage thereof to the transfer passage, said plate being arranged to normally close off said passage means to restrict the flow of fluid therethrough to the crankcase, an opening so disposed in said plate as to render said passage means communicable with the crankcase during a portion of the rotation of the plate, means for incorporating combustible constituents into said fluid, and means for igniting said combustible constituents of said fluid in said firing chamber.

9. A two cycle internal combustion engine including a crankcase, a crankshaft rotatable in the crankcase, a cylinder which communicates with the crankcase and a piston reciprocable in the cylinder, passage means in the wall of the crankcase for admitting fluid to the interior of the crankcase to be compressed therein by the piston during the down stroke thereof, means affording a transfer passage between the firing chamber in the cylinder and said crankcase for directing fluid compressed in said crankcase to said firing chamber in the cylinder above the piston for combustion, a plate mounted in the crankcase for rotation with the crankshaft and embodying filter means interposed between the crankcase and said transfer passage for filtering entrained lubricant or the like from the compressed fluid in the crankcase prior to the passage thereof to said transfer passage, said plate being arranged to normally close off said passage means to restrict the flow of fluid therethrough to the crankcase, an opening so disposed in said plate as to render said passage means communicable with the crankcase during a portion of the rotation of the plate, a fluid compressor on said plate in communication with the opening therein and effective during rotation of said plate to compress fluid in said crankcase, means for incorporating combustible constituents into said fluid, and means for igniting said combustible constituents of said fluid in said firing chamber.

10. A two cycle internal combustion engine having a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the firing chamber in the cylinder and said crankcase for directing fluid compressed in the crankcase to said firing chamber in the cylinder above the piston for combustion, a filter means interposed between the crankcase and the transfer passage and rotatable with the crankshaft to filter any entrained lubricant in said compressed fluid prior to entrance thereof in said transfer passage, an air port in the wall of the crankcase, a blower rotatable with said filter having a valve for controlling the passage of air through said air port to the crankcase to augment the compression of fluid in the crankcase by said piston, means for incorporating combustible constituents into said fluid, and means for igniting said combustible constituents of said fluid in said firing chamber.

11. An internal combustion engine including a crankcase, a crankshaft rotatable in the crankcase, a cylinder which communicates with the crankcase and a piston reciprocable in the cylinder, means for admitting air to the crankcase to be compressed therein as in incident to the down stroke of the piston, means affording a transfer passage between the crankcase and the firing chamber in the cylinder for directing the air compressed in the crankcase to said firing chamber above the piston, a filter means rotatable with said crankshaft and interposed between the crankcase and said transfer passage for filtering entrained lubricant or the like from said compressed air prior to the passage thereof from the crankcase to said firing chamber, and a passage means for introducing fuel into said compressed air after passage thereof through said filter means whereby there will be an admixture of air and fuel in said transfer passage flowing into said firing chamber.

12. An internal combustion engine including a crankcase, a crankshaft rotatable in the crankcase, a cylinder which communicates with the crankcase and a piston reciprocable in the cylinder, means for admitting air to the crankcase to be compressed therein as an incident to the down stroke of the piston, means affording a transfer passage between the crankcase and the firing chamber in the cylinder for directing the air compressed in the crankcase to said firing chamber above the piston, a filter means rotatable with said crankshaft between the crankcase and said transfer passage for filtering entrained lubricant or the like from said compressed air prior to the passage thereof from the crankcase to said firing chamber, and a passage means opening into said transfer passage for introducing fuel into the compressed air in said transfer passage to provide an admixture of air and fuel flowing to said firing chamber.

13. An internal combustion engine including a crankcase, a crankshaft rotatable in the crankcase, a cylinder which communicates with the crankcase and a piston reciprocable in the cylinder, means for admitting air to the crankcase to be compressed therein as an incident to the down stroke of the piston, means affording a transfer passage between the crankcase and the firing chamber in the cylinder for directing the air compressed in the crankcase to said firing chamber above the piston, a filter means rotatable with said crankshaft and interposed between the crankcase and said transfer passage for filtering entrained lubricant or the like from said compressed air prior to the passage thereof from the crankcase to said firing chamber, and a port in the wall of the cylinder above the piston for injecting fuel into the firing chamber for admixture therein with the compressed air flowing to the firing chamber from said transfer passage.

14. An internal combustion engine including a crankcase, a crankshaft rotatable in the crankcase, a cylinder which communicates with the crankcase and a piston reciprocable in the cylinder, passage means in the wall of the crankcase for admitting air to the interior of the crankcase to be compressed therein by the piston during the downstroke thereof, means affording a transfer passage between the firing chamber in the cylinder and said crankcase for directing fluid compressed in said crankcase to said firing chamber in the cylinder above the piston for combustion, a plate mounted in the crankcase for rotation with the crankshaft and embodying filter means interposed between said crankcase and the transfer passage for filtering entrained lubricant or the like from the compressed air in the crankcase prior to the passage thereof to said transfer passage, said plate being arranged to normally close off said passage means to restrict the flow of fluid therethrough to the crankcase, an opening so disposed in said plate as to render the passage means communicable with the crankcase during a portion of the rotation of the plate, and a port in the wall of the cylinder above the piston for injecting fuel into said firing chamber for admixture with the compressed air flowing thereto from said transfer passage.

15. A two cycle internal combustion engine including a crankcase, a crankshaft rotatable in the crankcase, a cylinder which communicates with the crankcase and a piston reciprocable in the cylinder, means for admitting air to the crankcase to be compressed therein as an incident to the down stroke of the piston, means affording a transfer passage between the crankcase and the firing chamber in the cylinder for directing the air compressed in the crankcase to said firing chamber above the piston, a filter means rotatable with said crankshaft and interposed between the crankcase and said transfer passage for filtering entrained lubricant or the like from said compressed air prior to the passage thereof from the crankcase to said firing chamber, and a passage means in the wall of the crankcase for directing fuel into said filter means for admixture with said compressed air prior to the passage thereof to said transfer passage.

16. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and the crankcase for directing lubricant upon the operative parts therein as an incident to the suction effects induced in the crankcase by said piston, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering entrained lubricant or the like from said compressed fluid prior to the passage thereof from the crankcase to said firing chamber.

17. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and an opening in the wall of the cylinder for directing lubricant upon operative parts of the engine as an incident to the suction effects induced by said piston, valve means associated with said oil passage to control the flow and supply of lubricant in said oil passage, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering entrained lubricant or the like from said compressed fluid prior to the passage thereof from the crankcase to said firing chamber.

18. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and operative parts of the engine for lubricating such operative parts as an incident to the suction effects induced in the crankcase by said piston, means affording a well in said crankcase in which residual lubricant supplied to the operative parts in the crankcase may collect, means operated by said crankshaft for picking up lubricant from said well and distributing the same to operative parts of the engine associated with said crankcase, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering entrained lubricant or the like from said compressed fluid prior to the passage thereof from the crankcase to said firing chamber.

19. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and the crankcase for directing lubricant upon the operative parts therein as an incident to the suction effects induced in the crankcase by said piston, valve means associated with said oil passage to control the flow and supply of lubricant in said oil passage, means affording a well in said crankcase in which residual lubricant supplied to the operative parts in the crankcase may collect, means operated by said crankshaft for picking up lubricant from said well and distributing the same to operative parts of the engine associated with said crankcase, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering entrained lubricant or the like from said compressed fluid prior to the passage thereof from the crankcase to said firing chamber.

20. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and operative parts of the engine for directing lubricant upon such operative parts as an incident to the suction effects induced in the crankcase by said piston, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, a disc mounted on the crankshaft within the crankcase for rotation therewith, filter means associated with the disc and interposed between the crankcase and the transfer passage for filtering entrained lubricants or the like from said compressed fluid prior to the passage thereof from the crankcase to the transfer passage, and an annular flange on the disc surrounding the filter means and having openings therein for admitting compressed fluid in the crankcase to the filter means.

21. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and operative parts of the engine for directing lubricant to such operative engine parts as an incident to the suction effects induced in the crankcase by said piston, passage means in the wall of the crankcase for admitting fluid to the interior of the crankcase to be compressed therein by the piston during the down stroke thereof, means affording a plate mounted in the crankcase for rotation with the crankshaft and embodying filter means interposed between the crankcase and the transfer passage for filtering entrained lubricant or the like from the compressed fluid in the crankcase prior to the passage thereof to the transfer passage, said plate being arranged to normally close off said passage means to restrict the flow of fluid therethrough to the crankcase, an opening so disposed in said plate as to render the passage means communicable with the crankcase during a portion of the rotation of the plate, and a fluid compressor on said plate in communication with the opening therein and effective during rotation of said plate to compress fluid in said crankcase.

22. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage in the engine from said reservoir to operative parts of the engine for directing lubricant to such operative parts as an incident to the suction effects induced in the crankcase by said piston, means for admitting fluid to the crankcase to be compressed therein as an incident to the down stroke of the piston, means affording a transfer passage between the firing chamber in the cylinder and said crankcase for directing fluid compressed in the crankcase to said firing chamber in the cylinder above the piston for combustion, a filter means interposed between the crankcase and the transfer passage and rotatable with the crankshaft to filter any entrained lubricant in said compressed fluid prior to entrance thereof in said transfer passage, an air port in the wall of the crankcase, and a blower rotatable with said filter having a valve for controlling the passage of air through said air port to the crankcase to augment the compression of fluid in the crankcase by said piston.

23. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and the crankcase for spraying lubricant mist upon the operative parts therein as an incident to the suction effects induced in the crankcase by said piston, means for admitting air to the crankcase to be compressed therein as an incident to the down stroke of the piston, means affording a transfer passage between the crankcase and the firing chamber in the cylinder for directing the air compressed in the crankcase to said firing chamber above the piston, a filter means rotatable with said crankshaft and interposed between the crankcase and said transfer passage for filtering entrained lubricant or the like from said compressed air prior to the passage thereof from the crankcase to said firing chamber, and a passage means for introducing fuel into said compressed air after passage thereof through said filter means whereby there will be an admixture of air and fuel in said transfer passage flowing into said firing chamber.

24. A two cycle internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage from said reservoir to operative parts of the engine for lubricating such operative engine parts as an incident to the suction effects induced in the crankcase by said piston, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering entrained lubricant or the like from said compressed fluid prior to the passage thereof from the crankcase to said firing chamber.

25. A two cycle internal combustion engine including a sealed crankcases, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and an opening in the wall of the cylinder to permit lubricant to be passed from the reservoir to operative parts of the engine in the cylinder as an incident to the suction effects induced in the crankcase by said piston, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering entrained lubricant or the like from said compressed fluid prior to the passage thereof from the crankcase to said firing chamber.

26. An internal combustion engine including a crankcase, a crankshaft rotatable in the crankcase, a cylinder which communicates with the crankcase and a piston reciprocable in the cylinder, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, filter means rotatable with said crankshaft and interposed between the crankcase and said transfer passage for filtering entrained lubricant or the like from said compressed fluid prior to the passage thereof from the crankcase to said firing chamber, means for incorporating combustible constituents into said fluid, and means for igniting said combustible constituents of said fluid in said firing chamber.

27. An internal combustion engine including a sealed crankcase, a crankshaft rotatable in the crankcase, a cylinder which communicates with the crankcase, a piston reciprocable in the cylinder and effective to induce alternate suction effects in the crankcase as an incident to reciprocation thereof in the cylinder, means affording a reservoir wherein a supply of lubricant may be stored, means affording an oil passage between said reservoir and the crankcase for directing lubricant upon the operative parts therein as an incident to the suction effects induced in the crankcase by said piston, means for admitting fluid to the crankcase to be compressed therein as an incident to the down stroke of the piston, means affording a transfer passage between the crankcase and the firing chamber in the cylinder for directing the fluid compressed in the crankcase to the firing chamber in the cylinder above the piston, and filter means rotatable with said crankshaft and interposed between the crankcase and said transfer passage for filtering lubricant or the like from said compressed fluid prior to the passage thereof from the crankcase to said firing chamber.

28. An internal combustion engine including a crankcase, a crankshaft rotatable in the crankcase, a cylinder which communicates with the crankcase and a piston reciprocable in the cylinder, means for admitting a combustible fluid to the crankcase to be compressed therein as an incident to the downstroke of the piston, means affording a transfer passage between the crankcase and the firing chamber in the cylinder for directing the fluid compressed in the crankcase to the firing chamber in the cylinder above the piston, filter means rotatable with said crankshaft and interposed between the crankcase and said transfer passage for filtering entrained lubricant or the like from said compressed fluid prior to the passage thereof from the crankcase to said firing chamber, and means for igniting said combustible fluid in said firing chamber.

References Cited in the file of this patent

UNITED STATES PATENTS

| | | |
|---|---|---|
| 821,915 | Altman | May 29, 1906 |
| 904,132 | Johnston | Nov. 17, 1908 |
| 923,046 | Gulick | May 25, 1909 |
| 952,824 | Liberty | Mar. 22, 1910 |
| 955,151 | Gilliard | Apr. 19, 1910 |
| 963,366 | Gathmann | July 5, 1910 |
| 1,013,955 | Roberts | Jan. 9, 1912 |
| 1,145,814 | St. Clair | July 6, 1915 |
| 1,296,214 | Petter | Mar. 4, 1919 |
| 1,385,250 | Gernandt | July 19, 1921 |
| 1,438,937 | Arnold | Dec. 19, 1922 |
| 2,060,752 | Celander et al. | Nov. 10, 1936 |
| 2,539,896 | Dalrymple | Jan. 30, 1951 |
| 2,728,412 | Bolsius et al. | Dec. 27, 1955 |

FOREIGN PATENTS

| | | |
|---|---|---|
| 388,087 | Germany | Jan. 8, 1924 |